(12) United States Patent
Etori et al.

(10) Patent No.: US 6,804,053 B2
(45) Date of Patent: Oct. 12, 2004

(54) SEE-THROUGH LIGHT TRANSMITTING TYPE SCREEN

(75) Inventors: Hideki Etori, Ohmiya (JP); Yasunori Sugiyama, Yono (JP)

(73) Assignee: Kimoto Co., Ltd. (JP)

( * ) Notice: Subject to any disclaimer, the term of this patent is extended or adjusted under 35 U.S.C. 154(b) by 0 days.

(21) Appl. No.: 09/740,809

(22) Filed: Dec. 21, 2000

(65) Prior Publication Data

US 2001/0005282 A1 Jun. 28, 2001

(30) Foreign Application Priority Data

Dec. 22, 1999 (JP) .......................................... 11-364169

(51) Int. Cl.[7] .......................... G03B 21/60; G03B 21/56
(52) U.S. Cl. ...................... 359/453; 359/459; 359/460
(58) Field of Search ................................ 359/452–453, 359/443, 459–460

(56) References Cited

U.S. PATENT DOCUMENTS 6,262,840 B1 * 7/2001 Watanabe et al. ........... 359/453
6,327,088 B1 * 12/2001 Iwata et al. .................. 359/599
6,337,769 B1 * 1/2002 Lee ............................. 359/454

* cited by examiner

Primary Examiner—Alan A. Mathews
Assistant Examiner—Magda Cruz
(74) Attorney, Agent, or Firm—Lorusso, Loud & Kelly

(57) ABSTRACT

A light transmitting type screen that enables the viewer to see through to its back side, when the screen is stuck on transparent object such as a show window or a transparent window glass or when it is used as a transparent object, and that is capable of forming clear images projected from a projected thereon is provided. The screen includes a light scattering layer having a front-scattering property, which is composed of spherical microparticles having a mean particle diameter in a certain range dispersed in a binder having a refraction index in a certain range. The light scattering layer is sandwiched between transparent objects such as high-molecular weight resin sheets or show window glass via an adhesive layer or the like.

12 Claims, 2 Drawing Sheets

SEE-THROUGH LIGHT TRANSMITTING TYPE SCREEN

BACKGROUND OF INVENTION

The present invention relates to a light transmitting type screen, in which images projected from its back side by a projector are seen from the side opposite the projector. Particularly, it relates to a light transmitting type screen excellent in transparency and making it possible to see through to the background behind the screen by employing a light scattering layer with a special light scattering property.

Conventionally, most practical light transmitting type screens use polarization films, Fresnel lens sheets, lenticular lens sheets, etc. in order to obtain high brightness and high contrast. However, such conventional light transmitting type screens are expensive because polarization films and lens sheets are high in cost, and it is almost impossible to see the background behind the screens.

A common way of advertising merchandize is to stick posters on show windows or to apply spray paint to show windows. These advertising displays are static and the contents thereof do not change unless the posters or spray paint displays are replaced. Use of a projector or the like might be considered for displaying dynamic advertisements on show windows, but projected images cannot be formed on show windows because of their high transparency.

Although an image projected from the back side can be seen if a conventional light transmitting type screen is attached to a show window, the presence of the screen makes it impossible to see displayed goods from the outside. The show window is therefore deprived of its function by the inability to see through the light transmitting type screen.

SUMMARY OF THE INVENTION

Accordingly, an object of the present invention is to provide a light transmitting type screen that enables the viewer to see through to its back side when the screen is adhered to a transparent object such as a show window or a transparent window glass or when it is used as a transparent object for forming clear images projected from a projector thereon.

The present inventors have found that projected images are clearly formed on a screen made from materials having a front-scattering property while objects behind the screen can be seen from the front. Front-scattering is an optical property whereby most incident light is scattered forward and little or no light backward. Front-scattering is caused by Mie scattering, that is, light scattering caused by spherical dielectric particles having a far larger diameter than the wavelength of light.

Specifically, the see-through light transmitting type screen of the present invention is characterized in that it has a light scattering layer having a front-scattering property.

The light scattering layer comprises a transparent binder and spherical microparticles. The spherical microparticles preferably have a mean particle diameter of 1.0 μm–10.0 μm and a refraction index (n) relative to the refraction index of the transparent binder satisfying a condition of 0.91<n<1.09 (n≠1.00). The transparent binder may be glass or high molecular weight resin.

The see-through light transmitting type screen of the present invention may include a transparent object provided on at least one side of the light scattering layer, disposed on the projector side or on the viewer side. The transparent object, if disposed on the projector side, preferably has a refraction index lower than that of the transparent binder of the light scattering layer. If disposed on the viewer side the transparent object has a refraction index higher than that of the transparent binder of the light scattering layer.

Optionally, an anti-reflection layer is provided on at least one side of the screen.

The see-through light transmitting type screen of the present invention preferably has a haze of 3.0% or more and distinctness of image of 60.0% or more.

The term "haze" used with respect to the present invention means a haze value determined in accordance with JIS-K7 105, which can be calculated according to the equation:

$H=[Td/Tt]\times 100$ [$H$: haze, $Td$: diffused light transmission, and $Tt$: total light transmission].

The term "distinctness of image" used with respect to the present invention means a value of distinctness of image determined in accordance with JIS-K7105, and it can be obtained by measuring the maximum wave height [M] and the minimum wave height [m] at an optical comb of 0.125 mm using the transmission method, and calculating according to the following equation:

Distinctness of image $[C_{(0.125)}=\{M-m\}/\{M+m\}\times 100(\%)$

The value of distinctness of image used for the present invention is an average of values measured along the longitudinal direction and the transverse direction for each sample.

PREFERRED EMBODIMENT OF THE INVENTION

Figure 1:
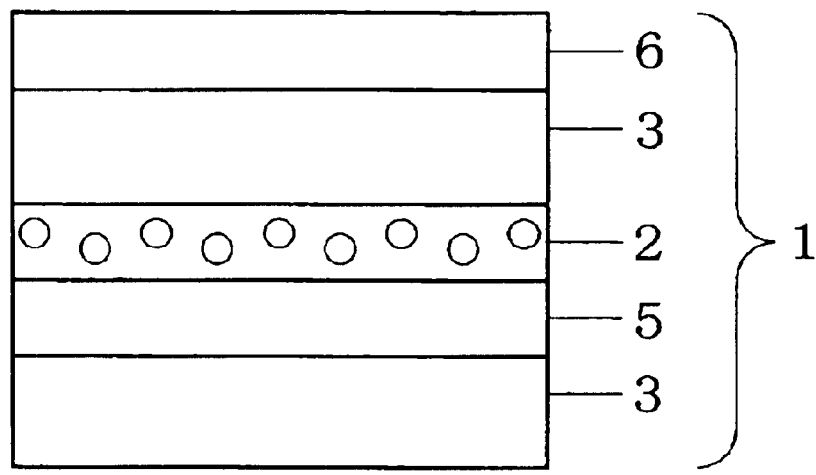
FIG. 1 is a sectional view of a light transmitting type screen exemplary of the present invention.

The light transmitting type screen of the present invention will be explained in more detail with reference to the drawings.

Examples of the light transmitting type screen of the present invention are shown in FIGS. 1–5.

As shown in the figures, the light transmitting type screen 1 of the present invention (occasionally referred to "the screen" hereinafter) has a light scattering layer 2 having a front-scattering property. It may be a single layer screen consisting of the light scattering layer 2 (FIG. 4) or a multiple layer screen including other layers superimposed on or laminated to the light scattering layer 2 (FIGS. 1–3, FIG. 5). The light scattering layer 2 and other components will be explained in detail.

The light scattering layer 2 with a front-scattering property is, specifically, a layer consisting of a transparent binder in which spherical microparticles satisfying the Mie scattering conditions are dispersed.

The transparent binder containing the spherical microparticles, which is a transparent material capable of dispersing the spherical microparticles, is not limited to a solid and may be a fluid such as a liquid or a liquid crystal. However, in order to keep its shape for a single layer type etc., glass or a high molecular weight resin is preferred.

Any glass can be used so long as it does not impair the see—through property of the light scattering layer. Practical glasses include oxidized glass such as silicate glass, phosphate glass, and borate glass. The glass is preferably silicate glass, alkali silicate glass, soda-lime glass, potassium lime glass, lead glass, barium glass, or a silicate glass such as borosilicate glass.

When glass is used as the transparent binder, it is desirable that the spherical microparticles are added to the raw material for forming same including, for example, lime and silicate as main components, to form a plate glass and the surface of the plate glass is polished flat. By this, the glass can obtain a high see-through property and becomes suitable for the screen of the present invention.

The high molecular weight resin is not particularly limited so long as it does not impair the see-through property of the light scattering layer, and may be a thermoplastic resin, thermosetting resin, or ionized radiation curable resin. Such resins include polyester resins, acrylic resins, acrylic urethane resins, polyester acrylate resins, polyurethane acrylate resins, epoxy acrylate resins, urethane resins, epoxy resins, polycarbonate resins, cellulose resins, acetal resins, vinyl resins, polyethylene resins, polystyrene resins, polypropylene resins, polyamide resins, polyimide resins, melamine resins, phenol resins, silicone resins, and fluorine resins, etc. The high molecular weight resin can be formed into a screen having the structure shown in FIG. 4, for example, by melting the resin, adding the spherical particles to the resin and forming a sheet. Alternatively, a paint including the high molecular weight resin and spherical microparticles is applied to another transparent object to form a layer and thereby produce a screen having the structure shown in FIG. 5, for example.

As spherical microparticles included in the transparent binder, inorganic microparticles such as those of silica, alumina, talc, zirconia, zinc oxide, titanium dioxide and the like, and organic microparticles such as those of polymethyl methacrylate, polystyrene, polyurethane, benzoguanamine, silicone resin and the like can be used. The organic microparticles are preferable, because spherical shape can be more easily obtained with these materials.

In order to impart a good front-scattering property to the light scattering layer, the particle diameter of the spherical microparticles is preferably 1.0 $\mu$m–10.0 $\mu$m, more preferably 2.0 $\mu$m–6.0 $\mu$m, in mean diameter. With the particle diameter in the range of 1.0 $\mu$m–10.0 $\mu$m, the ratio of backward scattering light in the total scattered light can be sufficiently reduced. Thereby, the see-through property of the screen can be kept and clear images can be projected on the screen by projectors.

In addition, in order to impart a good front-scattering property to the light scattering layer, the refraction index of the spherical microparticles (n), relative to the refraction index of the transparent binder, (value obtained by dividing the refraction index of the spherical microparticles by the refraction index of the transparent binder, referred to as "relative refraction index" hereinafter) is preferably $0.91 < n < 1.09$ ($n \neq 1$). When the relative refraction index n. is larger than 0.91 or smaller than 1.09, the ratio of backward scattered light in total scattered light can be sufficiently reduced and thereby the see-through property of the screen can be kept and clear images can be projected on the screen by the projector.

The spherical microparticles may consist of either one or two or more kinds of such particles, so long as the particles satisfy the requirements described above. When two or more kinds of the spherical microparticles are used in admixture, they may be two or more kinds of the spherical microparticles having different refraction indices, or they may be two or more kinds of the spherical microparticles different only in their diameters.

As mentioned above, by employing the light scattering layer with a front-scattering property in which spherical microparticles having a mean particle diameter in a certain range are dispersed in a binder having a refraction index ratio in a certain range, a see-through property, which cannot be obtained by the light scattering layer used in the conventional screen in which light is scattered by the surface roughness, can be obtained and clear images can be projected on the screen by projectors.

Although the light transmitting type screen of the present invention may consist of a single layer of such a light scattering layer, it is preferably provided with another transparent object on at least one side of the light scattering layer.

When the screen consists of a single layer of the light scattering layer, as in FIG. 1, the particles may protrude from the screen surface to make the surface rough and impair the see-through property by scattering incident light at the surface. When the screen is provided with the transparent object on at least one side of the light scattering layer, formation of such a surface roughness is suppressed and loss of the see-through property can be prevented.

A plate glass or a high molecular weight resin sheet, which is the same as used for the transparent binder of the light scattering layer, can be used for the transparent object.

The transparent object can be a substrate for forming the light scattering layer by applying a paint including the high molecular resin and spherical microparticles. The transparent object may be superimposed or laminated, directly or via a transparent adhesive layer or bond layer, on the light scattering layer formed on another transparent object. Examples of the laminated screen having a light scattering layer provided with transparent objects on the opposite sides are shown in FIGS. 1–3.

Figure 2:
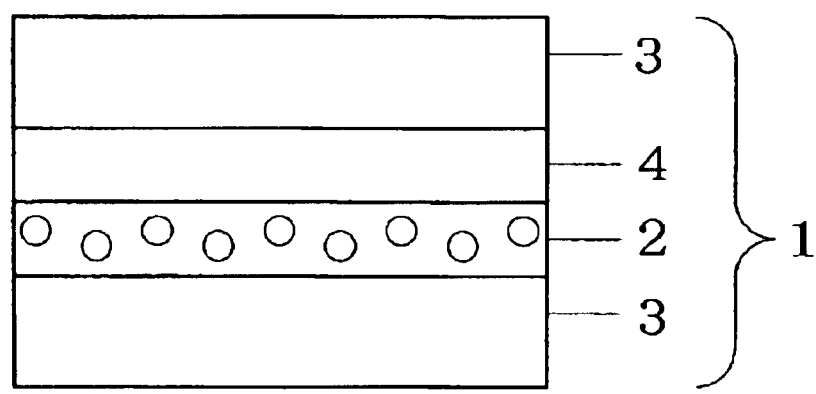
FIG. 2 is a sectional view of another light transmitting type screen exemplary of the present invention.
Figure 3:
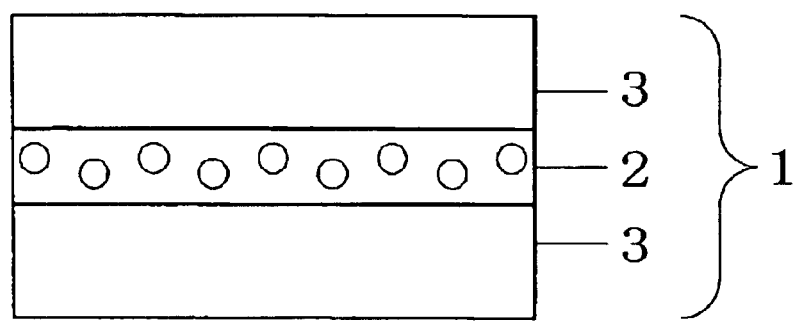
FIG. 3 is a sectional view of yet another light transmitting type screen exemplary of the present invention.
Figure 4:
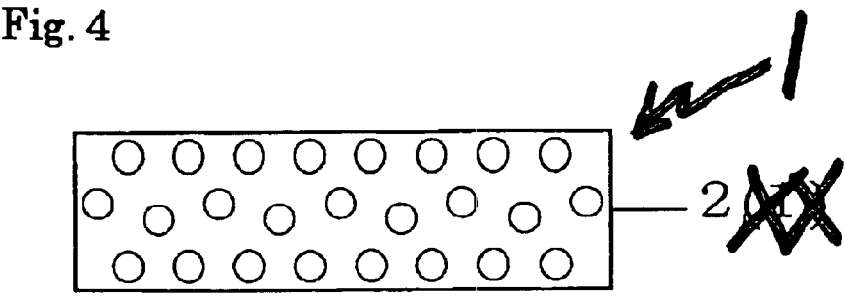
FIG. 4 is a sectional view of yet another light transmitting type screen exemplary of the present invention.
Figure 5:
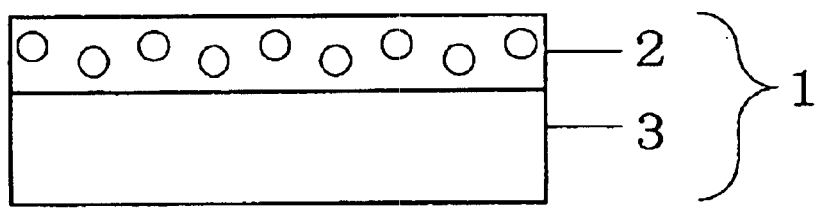
FIG. 5 is a sectional view of yet another exemplary light transmitting type screen exemplary of the present invention.

In the structure shown in FIG. 2, for example, the light scattering layer 2 is sandwiched between plate glasses 3 ("transparent object") using a transparent intermediate layer (bond layer) 4. In the structure shown in FIG. 1, the light scattering layer 2 is sandwiched between a high molecular weight resin sheet and a show window glass 3 to form a screen 1. The screen shown in FIG. 1 is provided with a hard coat layer 6 on a transparent object (layer) 3 made of a high molecular weight resin.

The adhesive layer or bond layer may be a known material which does not impair transparency of the screen. Examples of such materials include synthetic resins such as acrylic resins, epoxy resins, ethylene-vinyl acetate resins, polyvinyl ether resins, polyvinyl acetal resins, cellulose resins, polyester resins, polyurethane resins, polyamide resins, polyolefin resins, phenol resins, cyanoacrylate resins and the like, and rubber resins such as natural rubbers, reprocessed rubbers, chloroprene rubbers, nitryl rubbers, styrene-butadiene rubbers and the like.

When the screen of the present invention consists of the laminated layers, it is preferable that the transparent object 3 disposed on the projector side have a refraction index smaller than that of the transparent binder of the light scattering layer 2. On the other hand, the transparent object 3 disposed on the viewer side preferably has a refraction index larger than that of the transparent binder of the light scattering layer 2.

Figure 6:
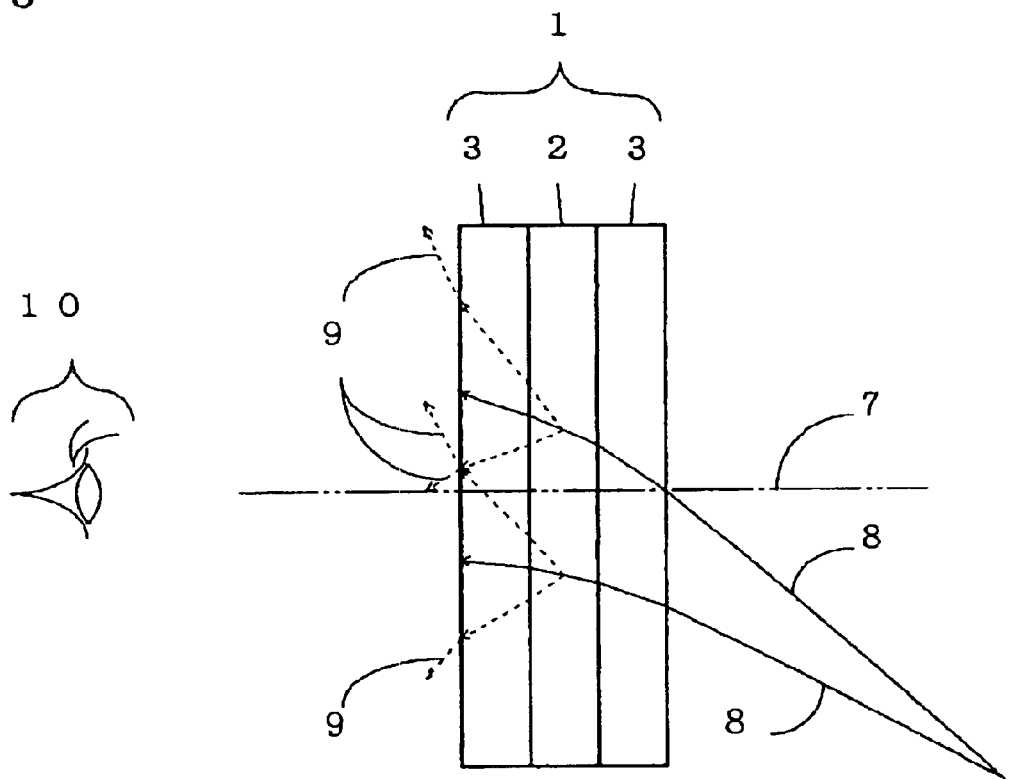
FIG. 6 is a sectional view explaining light passage through the light transmitting type screen of the present invention.

By making the refraction indices of the light scattering layer 2 and transparent object 3 increase from the projector side to the side of viewer 10, light projected from the back side of the screen in the inclined direction can be directed toward the perpendicular, as shown in FIG. 6.

Generally, in the light transmitting type screen, when light is projected perpendicular to the screen, the so-called hot spot phenomenon (where light from the projector is directly seen by viewers) cannot be avoided. In order to avoid this phenomenon, light is projected at an angle of some extent to the perpendicular 7 (two dot chain line) of the screen 1 (thick continuous line). In this case, by making the refraction indices of the components constituting the laminate inclined as mentioned above, projected light 8 (continuous-line arrow) is compelled to proceed in the perpendicular direction by refraction of light. It is especially important to make the refraction index of the transparent binder of the light scattering layer 2 large.

In addition, in the above-mentioned constitution, transmitted light 9 scattered at the light scattering layer 2 exits the screen 1 at a wide angle to the perpendicular of the screen and therefore the view angle of the screen is broadened.

The screen of the present invention may be provided with an anti-reflection layer (not shown) on at least one of its surfaces. The anti-reflection layer prevents reduction of the amount of light of images projected by a projector and enables viewers to see clear images.

The anti-reflection layer is a layer having a property capable of canceling reflected light by utilizing interference of light at the layer interface. Known anti-reflection layers can be employed. Specifically, it may be a single layer which consists of a highly transparent layer with a small refraction index such as silicon oxide, fluorinated lithium, and the like, and has an optical thickness equal to ¼ of the wave length of the main light of concern. It may be a proper combination of such a small refraction index layer and a large refraction index layer such as titanium oxide, zinc oxide and the like, or a medium refraction index layer.

As mentioned above, the screen of the present invention is provided with a light scattering layer having a front-scattering property, and other transparent objects suitably combined therewith. With regard to optical properties, it has a haze of 3.0% or more, preferably 7.0% or more, more preferably 15.0% or more and distinctness of image of 60.0% or more, preferably 65.0% or more, more preferably 70.0% or more.

The haze and the distinctness of image can be adjusted within the above-mentioned range by suitably adjusting the content of the spherical microparticles in the light scattering layer and/or the thickness of the light scattering layer within the ranges in which the front-scattering property of the light scattering layer is obtained.

With a haze of 3.0% or more and a distinctness of image of 60.0% or more, the screen can have sufficient see-through and provide clear display of images projected from the projector.

According to the present invention, by employing a light scattering layer having a front-scattering property, a light transmitting type screen capable of forming clear images projected by a projector and yet providing see-through is obtained.

Accordingly, the screen of the present invention can be a light transmitting type screen without an expensive lens, sheet such as a Fresnel lens or a lenticular lens, and provides see-through which is not provided by the conventional lens sheet. In addition, the screen having a light scattering layer of a front-scattering property is free from constraint of projection angle from a projector toward a screen, which is inevitable for the lens sheet, depending on its shape.

Moreover, according to the present invention, light projected at an angle to the perpendicular of the screen is transmitted from the screen in the perpendicular direction by making the refraction index of the transparent binder of the light scattering layer large and making the refraction indices of the light scattering layer and the transparent object constituting the screen increase from the projector side to the viewer side. Thereby, brightness in the perpendicular direction of the screen can be increased and the view angle can be broadened.

According to the present invention, it is possible to balance visibility of the background behind the screen and the projected images by adjusting the light intensity of images projected by the projector. For example, by enhancing the light intensity projected by the projector, the projected images on the screen can be made extremely clear. By suitably suppressing the light intensity, both the background behind the screen and the projected images can be seen at the same time.

EXAMPLES

The present invention will be further explained hereinafter with reference to the following examples. The term "part(s)" and "%" are used on a weight basis unless otherwise indicated.

Example 1

100 parts by weight of polyvinyl butyral resin (degree of polymerization: 1700, degree of butyral: 66 mol %) was blended with 40 parts by weight of triethyleneglycol-2-ethyl butyrate as a plasticizer, and admixed by a roll at 110° C. to form a transparent intermediate film 4 having thickness of 0.5 mm.

A coating solution for a light scattering layer a having the following composition was applied to a float-glass plate 3 (refraction index: 1.51) having a thickness of 3 mm and dried to form a light scattering layer having a dry thickness of 35 μm on the glass plate 3.

Coating solution for a light scattering layer a, relative refraction index n=0.92

| | |
|---|---|
| polystyrene resin (Styron 666, refraction index: 1.59, Asahi Chemical Industry Co., Ltd.), acrylic resin particles | 100 parts |
| | 2 parts |
| (Techpolymer MBX-5, refraction index: 1.47, mean particle diameter: 5.0 μm, Sekisui Plastics Co., Ltd.) methylethyl ketone | 75 parts |
| toluene | 75 parts |

Then, the transparent intermediate layer 4 and a float-glass plate 3 (refraction index: 1.51) were superimposed on the light scattering layer 2 formed on the glass plate 3 in this order. They were placed in a rubber bag and, after the pressure was reduced to a vacuum of 1.3 kPa, maintained for 30 minutes while heating at 120° C. Then, the reduced pressure was removed by cooling and the laminate was taken out from the rubber bag, placed in an autoclave and maintained for 20 minutes while heating at 140° C. and pressurizing to 1.3 Mpa. Then, it was cooled to form a light transmitting type screen 1 having the structure shown in FIG. 2.

Using a liquid crystal projector (XV-P3:Sharp Corp.), images were projected to the thus obtained screen 1 from about 30° under the perpendicular to the screen 1. As a result, the images were clearly seen from the side opposite the projector. Further, since the screen obtained in Example 1 had a see-through property, the background behind the screen 1 could be seen through it.

The screen 1 obtained in Example 1 had a haze of 30.4%, and distinctness of image of 90.3%.

Example 2

To one surface of a polyethylene terephthalate film 3 having a thickness of 100/Am (Lumilar T-60, refraction index: 1.64, Toray Industries, Inc.), a coating solution for a hard coat layer having the following composition was applied and dried. Then the coating layer was exposed to ultraviolet rays using a high-pressure mercury lamp for 1–2 seconds to form a hard coat layer 6 having a dry thickness of 5 $\mu$m. To the other surface of the film 3, a coating solution b for a light scattering layer and a coating solution for an adhesive layer were applied successively and dried to form a light scattering layer 2 having a dry thickness of 35 $\mu$m and an adhesive layer 5 having a dry thickness of 10 $\mu$m. Then, a float-glass plate 3 (refraction index: 1.51) having a thickness of 5 mm was laminated to the adhesive layer 5 to form a light transmitting type screen having the structure shown in FIG. 1.

| Coating solution for a hard coat layer | |
|---|---|
| Curable acrylate resins (TjniDick 17-806, solid content 80%, Dainippon Ink & Chemicals, Inc.) | 30 parts |
| photopolymerization initiator (IrgaCure 651: Ciba Specialty Chemicals Co.) | 1 parts |
| methylethyl ketone | 35 parts |
| toluene | 35 part |
| Coating solution for a light scattering layer | |
| b: relative refraction index n = 0.92 | |
| polyester resin (Kemit 1249, refraction index: 1.56, Toray Industries, Inc.) | 100 parts |
| silicone resin particles [Tospearl 120, refraction index: 1.44, mean diameter: 2.0 $\mu$m, GE Toshiba Silicone Co.] | 1.5 parts |
| methylethyl ketone | 75 parts |
| toluene | 75 parts |
| Coating solution for an adhesive layer | |
| Acrylic adhesive (OlibainBPS11O9, refraction index: 1.47, solid content: 40%, TOYO INK MEG. CO., LTD.) | 100 parts |
| isocyanate curing agent (OlibainBHS8515, solid content: 38%, TOYO INK MFG. CO., LTD.) | 2.4 parts |
| ethyl acetate | 100 parts |

Using a liquid crystal projector (XV-P3:Sharp Corp.), images were projected onto the glass 3 having the smallest refraction index of the thus obtained screen 1 from about 30° under the perpendicular of the screen 1. When the images were observed from the film 3 providing the largest refraction index opposite the projector side, clear images could be seen. Further, since the screen obtained in Example 2 had a see-through property, the background behind the screen 1 could be seen through it.

The screen 1 obtained in Example 2 had a haze of 22.7%, and distinctness of image of 91.6%.

Example 3

To one surface of a polyethylene terephthalate film 3 having a thickness of 188 $\mu$m (Lumilar T60, refraction index: 1.64, Toray Industries, Inc.), a coating solution c for a light scattering layer was applied and dried to form a light scattering layer 2 having a dry thickness of 35 $\mu$m. A triacetyl cellulose film 3 having a thickness of 80 $\mu$m (Fuji Tack ETBO: refraction index: 1.49, Fuji Photo Film Co., Ltd.) was laminated on the light scattering layer to form a light transmitting type screen 1 having the structure shown FIG. 3.

| Coating solution c of a light scattering layer, relative refraction index n = 1.06 | |
|---|---|
| urethane bonding agent (Takelack A-971, refraction index: 1.50, solid content 50%, Takeda Chemical Industries) | 100 parts |
| isocyanate curing agent (Takenate A-3, solid content: 75%, Takeda Chemical Industries, Ltd.) | 7.6 part |
| polystyrene resin particle (Techpolymer SBX-6: refraction index: 1.59, mean particle diameters: 6.0 $\mu$m, Sekisui Plastics Co., Ltd.) | 0.7 parts |

Using a liquid crystal projector (XV-P3:Sharp Corp.), images were projected onto the triacetyl cellulose film 3 having the smallest refraction index of the thus obtained screen 1 from about 30° under the perpendicular to the screen 1. When the images were observed from the side of the polyethylene terephthalate film 3 having a large refraction index opposite the projector side, clear images could be seen. Further, since the screen obtained in Example 3 had a see-through property, the background behind the screen 1 could be seen through it.

The screen 1 obtained in Example 3 had a haze of 9.8%, and distinctness of image of 92.1%.

Example 4

To both sides of the screen 1 obtained in Example 3, anti-reflection coating agent (OA-201 F:Nissan Chemical Industries, Ltd.) was applied and dried to a thickness of about 100 nm. Thus, a light transmitting type screen 1 with anti-reflection coating was formed.

Using a liquid crystal projector (XV-P3:Sharp Corp.), images were projected onto the triacetyl cellulose film 3 having the smallest refraction index of the thus obtained screen 1 from about 30° under the perpendicular to the screen 1. When the images were observed from the side of the polethylene terephalate film 3 having a large refraction index opposite the projector side, clear images could be seen. Further, since the screen obtained in Example 4 had a see-through property, the background behind the screen 1 could be seen through it.

The screen 1 obtained in Example 4 had a haze of 9.7%, and distinctness of image of 92.2%.

Comparative Example

Using a liquid crystal projector (XV-P3:Sharp Corp.), images were projected onto a float-glass plate having a thickness of 5 mm from about 30° under the perpendicular to the screen 1 and the images were observed from the side opposite the projector side. As a result, background behind the glass could be seen through the float-glass plate but projected images could not be seen.

The float-glass plate had a haze of 0.8%, and a distinctness of image of 98.2%.

What is claimed is:

1. A see-through light transmitting type screen simultaneously allowing viewing through the screen to see background behind the screen and displaying images projected thereon, said screen comprising a light scattering layer providing Mie-scattering and having a front-scattering property and a transparent layer laminated on at least one side of said light scattering layer, said light scattering layer comprising a transparent binder and spherical microparticles dispersed in said transparent binder, wherein the spherical microparticles have a mean particle diameter of 1.0 $\mu$m–10.0 $\mu$m and a refraction index relative to that of the transparent binder n satisfying 0.91<n<1.09 (n≠1).

2. The light transmitting type screen of claim 1 further comprising an anti-reflection layer provided on at least one side of the light scattering layer.

3. The light transmitting type screen of claim 1, wherein the screen has a haze of 3.0% or more and distinctness of image of 60.0% or more.

4. The light transmitting type screen of claim 1, wherein the transparent binder is glass or a high molecular weight resin.

5. The light transmitting type screen of claim 1, wherein the transparent layer has a refraction index lower than that of the transparent binder of the light scattering layer.

6. The light transmitting type screen of claim 1, wherein the transparent layer has a refraction index higher than that of the transparent binder of the light scattering layer.

7. The light transmitting type screen of claim 1, wherein said transparent binder is glass.

8. The light transmitting type screen of claim 1, wherein said transparent binder is a high molecular weight resin.

9. The light transmitting type screen of claim 1, wherein the spherical microparticles have a mean particle diameter of 2.0 $\mu$m–6.0 $\mu$m.

10. The light transmitting type screen of claim 1, wherein said spherical microparticles are didspensed in said transparent binder in three-dimensions.

11. The light transmitting type screen of claim 1 wherein said transparent layer is plate glass.

12. The light transmitting type screen of claim 1 wherein said spherical microparticles do not protrude from the light-scattering layer.

* * * * *